Feb. 8, 1949.   D. P. FAULK   2,460,816
ELECTRONIC TIMING SYSTEM
Filed Oct. 15, 1947   2 Sheets-Sheet 1

FIG. 1

INVENTOR
DONALD P. FAULK
BY Elmer J. Gorn
ATTORNEY

Patented Feb. 8, 1949

2,460,816

UNITED STATES PATENT OFFICE 2,460,816

ELECTRONIC TIMING SYSTEM

Donald P. Faulk, Waltham, Mass., assignor to Raytheon Manufacturing Company, Newton, Mass., a corporation of Delaware Application October 15, 1947, Serial No. 780,040

19 Claims. (Cl. 320—1)

This invention relates to an electronic timing system for producing a square-wave voltage pulse of predetermined timed pulse duration.

An object of this invention is to devise an electronic timing system for producing a square-wave voltage pulse of predetermined pulse duration, the system having a novel circuit arrangement such that the predetermined pulse duration will not be changed by variations of the supply voltage for the system.

Another object is to provide an electronic timing system for producing a variable frequency square wave of voltage, the system having a novel circuit arrangement such that the duration of either the positive or negative loops of the square wave may be independently controlled.

A further object is to provide an improved electronic timing system for predetermining the duration of both the positive and negative loops of a square wave of voltage produced across a pair of output terminals to be substantially equal to the time duration of an adjustable predetermined number of full cycles of alternating current line voltage energizing the system, the numbers of full cycles for the positive and negative loops being independently adjustable.

A still further object is to devise a system of the above character which is simple and reliable in operation.

An additional object is to devise an electronic timing system of the type employing thyratron tubes for starting and stopping the timing function and having grid bias rectifying circuits for providing potentials of adjustable wave form having predetermined voltage peaks to be applied to the thyratron control grids to thereby control the initiation of their conduction periods in such a way as to be coincident with predetermined points in the cycle of the alternating current line voltage energizing the timing system and the grid bias rectifying circuits.

The foregoing and other objects of the invention will be best understood from the following description of an exemplification thereof, reference being had to the accompanying drawings, wherein.

Figure 1:
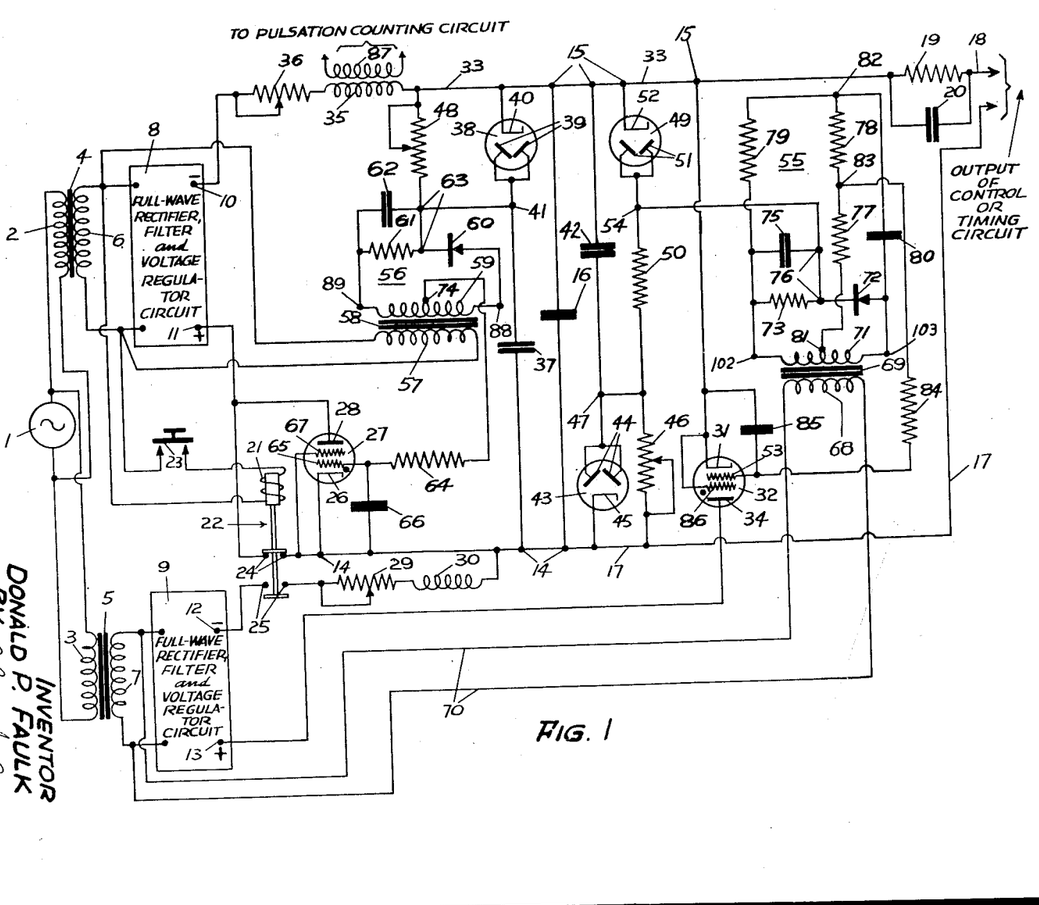
Fig. 1 is a circuit diagram of the timing system.

Referring to Fig. 1, a suitable source 1 of alternating current line voltage is connected to supply the respective primaries 2 and 3 of a pair of power transformers 4 and 5, the respective secondaries 6 and 7 of which provide input power for the respective pair of similar direct current power supplies 8 and 9. The power supplies 8 and 9 are conventional and so are shown in block form. Each power supply includes a full-wave rectifier, together with a filter and voltage regulator circuit, each circuit being so arranged that a direct voltage is produced at the output terminals of each power supply, each such voltage being independent of either the voltage of the supply source 1 or the load drawn from such power supply. Power supply 8 has a negative output terminal 10 and a positive output terminal 11, while power supply 9 has a negative output terminal 12 and a positive output terminal 13. The output voltage between terminals 10 and 11 is intended to be equal to that between terminals 12 and 13 and the output voltage of each source may be on the order of 220 volts, for example.

The output voltage of the timing system is that appearing across the opposite terminals 14 and 15 of the main condenser or capacitor 16. Leads 17 and 18 serve as the output leads of the timing system. These leads may be connected to serve as the input of any suitable translating or control circuit to thereby control in turn such a control circuit. For example, the leads may be connected to control, for conduction or non-conduction, tubes of a translating circuit such as that disclosed in the copending application of John W. Dawson and Donald P. Faulk, Ser. No. 733,902, filed March 11, 1947. Lead 17 is connected directly to terminal 14 while lead 18 is connected, through a resistor 19 having a condenser 20 in parallel therewith, to terminal 15. Resistor 19 and condenser 20 are provided so that when the grids in the translating circuit tubes, to which lead 18 is connected, are driven positive by the voltage wave supplied between leads 17 and 18, only a negligible grid current will be drawn in such tubes.

Since the output voltage of the system is the voltage across capacitor 16, and since a square-wave voltage output is desired, the object of the system is to charge said capacitor rapidly in one direction and then to rapidly reverse the charge, this process continuing throughout the time during which the system is energized.

The operating winding 21 of a relay 22 is connected in series with a switch 23, which may be a foot switch, across the alternating current secondary winding 6, so that when switch 23 is closed, relay 22 will be energized. Relay 22 has one pair of normally-closed contacts 24 and one pair of normally-open contacts 25. One of the contacts 24 is connected to the cathode 26 of a grid-controlled gaseous discharge device 27, while the other contact 24 is connected to anode 28 of device 27, so that when contacts 24 are closed during the normal or standby condition of the system, the anode-cathode path of tube 27 is short-circuited. Anode 28 is connected directly to the positive terminal 11 of power supply 8, as shown, while cathode 26 is connected to lead 17 and terminal 14 of condenser 16.

One of the contacts 25 is connected to negative terminal 12 of power supply 9, while the other contact 25 is connected, through a potentiometric resistor 29 and an inductor 30 in series, to lead 17 and terminal 14. The cathode 31 of a second grid-controlled gaseous discharge device 32 is connected to lead 33 and terminal 15, while the anode 34 of tube 32 is connected directly to positive terminal 13 of power supply 9. It may therefore be seen that contacts 25 are in series in the anode circuit of tube 32, which is supplied from power supply 9, so that when contacts 25 are opened during standby, the anode circuit of tube 32 is open-circuited. Lead 33 is connected, through an inductor 35 and a potentiometric resistor 36 in series, to terminal 10 of power supply 8.

During standby, with relay 22 unenergized, condenser 16 is charged from supply 8, through a circuit as follows: terminal 11, contacts 24, terminal 14, condenser 16, terminal 15, inductor 35, resistor 36, and terminal 10, with point 14 positive and point 15 negative. The time constant of this charging circuit is made such that, with standby periods of reasonable length, condenser 16 charges during standby to the voltage of source 8.

Between leads 17 and 33 there are connected in series an "on" time timing capacitor 37 and a diode rectifier 38, the anodes 39 of said rectifier being connected to capacitor 37 and the cathode 40 thereof being connected to lead 33. During standby, condenser 37 is charged from supply 8, through a circuit as follows: terminal 11, contacts 24, terminal 14, condenser 37, point 41, anode 39, cathode 40, inductor 35, resistor 36, and terminal 10, with point 14 positive and point 41 negative.

Connected in series between leads 17 and 33 are an "off" time timing capacitor 42 and a diode rectifier 43, the anodes 44 of said rectifier being connected to capacitor 42 and the cathode 45 thereof being connected to lead 17. Connected directly across rectifier 43 is a resistor 46, which is adjustable and may be calibrated as shown in detail by Fig. 2 of the drawings to be hereinafter referred to. During standby, condenser 42 is charged from supply 8, through a circuit as follows: terminal 11, contacts 24, resistor 46, point 47, condenser 42, point 15, inductor 35, resistor 36, and terminal 10, with point 47 positive and point 15 negative. Condenser 42 cannot charge through tube 43 as said tube is a rectifier and cannot conduct with its cathode 45 positive with respect to its anodes 44.

Connected directly across rectifier 38 is a resistor 48, which is adjustable and may be calibrated as shown in detail by Fig. 2 of the drawings to be hereinafter referred to. Condenser 16 has a large value of capacitance compared to that of condensers 37 and 42, and may for example have a capacitance which is on the order of ten times that of condensers 37 and 42. When point 14 is positive with respect to point 15, condenser 37 will immediately assume the same charge as condenser 16 because of almost instantaneous conduction through tube 38, but when point 15 is positive with respect to point 14, condenser 37 will charge slowly to the potential of condenser 16 through resistor 48 because of the impossibility of reverse conduction through tube 38. Similarly, when point 15 is positive with respect to point 14, condenser 42 will immediately assume the same charge as condenser 16 because of almost instantaneous conduction through tube 43, but when point 14 is positive with respect to point 15, condenser 42 will charge slowly to the potential of condenser 16 through resistor 46 because of the impossibility of reverse conduction through tube 43.

In order to prevent thyratrons 27 or 32 from becoming conductive except at predetermined times coincident with a predetermined point in the cycle of alternating current line voltage 1, grid bias voltage supplies 55 and 56, herein termed full-cycling circuits, are provided, said supplies being designed to produce an output voltage having a peaked voltage wave form with the voltage peaks occurring coincident with predetermined points in the cycle of the alternating current line voltage 1.

First referring to full-cycling circuit or network 56, the primary winding 57 of a transformer 58 is supplied with alternating current of line frequency by having its opposite ends connected directly across secondary winding 6 of power transformer 4. Across the ends of center-tapped secondary 59 of transformer 58 are connected in series a rectifier 60 and a resistor 61, and a condenser 62 is connected directly across resistor 61. The points 63, common to rectifier 60, resistor 61, and condenser 62, are connected directly to point 61 and to the lower end of adjustable resistor 48. The center point 74 of secondary 59 is connected through a resistor 64 to the control grid 65 of gas tetrode 27. A condenser 66 is connected between control grid 65 and cathode 26 of device 27, while shield grid 67 of said device is connected directly to said cathode as shown.

Point 14 is connected directly to cathode 26 of tube 27, as will be observed, so that the voltage on control grid 65 with respect to cathode 26 is the algebraic sum of two component voltages, one being the voltage across condenser 37 (between points 14 and 41) and the other being the output voltage of the full-cycling circuit 56, which is the voltage appearing between points 63 and the center tap 74 of winding 59. It will be seen that point 63 is connected through resistor 48 to the negative lead 33 of the source 8, while point 74 is connected to grid 65 of tube 27 and anode 28 of said tube is connected to positive terminal 11 of said source, cathode 26 also being connected to lead 33 through the condenser 16.

Now referring to full-cycling circuit or network 55, the primary winding 68 of a transformer 69 is supplied with alternating current of line frequency by having its opposite ends connected directly across secondary winding 7 of power transformer 5 by means of leads 70. Across the ends of center-tapped secondary 71 of transformer 69 are connected in series a rectifier 72 and a resistor 73, and a condenser 75 is connected directly across resistor 73. Points 102 and 103 are located at opposite ends of secondary winding 71 as shown. The points 76, common to rectifier 72, resistor 73, and condenser 75, are connected directly to point 54 and through resistor 58 to point 47 and to the upper end of adjustable resistor 46.

Thus far, the full-cycling circuit 55 is substantially the same as circuit 56. However, in order to add a 90° phase-shifted alternating current component to the output of circuit 55, for a purpose to be described hereinafter, a circuit comprising resistors 77—79 and condenser 80 is provided, to add such a component to the voltage ordinarily appearing at the mid-point 81 of winding 71, which mid-point is one of the output terminals of the basic full-cycling circuit. Resistor 79 and condenser 80 are connected in series across the winding 71, while a pair of resistors 77 and 78 are connected in series between the center tap 81 and a point 82 which is common to resistor 79 and condenser 80. The lower side of condenser 80 is connected to point 103, to which one terminal of rectifier 72 is also connected, while the lower end of resistor 79 is connected to point 102, to which one side of resistor 73 and one terminal of condenser 75 are also connected. A lead extends from a point 83, which is located between resistors 77 and 78, through a resistor 84 to control grid 53 of gas tetrode 32. A condenser 85 is connected between control grid 53 and cathode 31 of device 32, while shield grid 86 of said device is connected directly to said cathode as shown.

Point 15 is connected directly to cathode 31 of tube 32, as will be observed, so that the voltage on control grid 53 with respect to cathode 31 during energization of the system is mainly the algebraic sum of two component voltages, one being the voltage across condenser 42 (between points 15 and 47) and the other being the output voltage of the full-cycling circuit 55 (the basic full-cycling circuit with an alternating current component circuit added), which is the voltage appearing between point 76 and the point 83. It will be seen that point 76 is connected through resistors 50 and 46 to the negative lead 17 of the source 9, while point 83 is connected to grid 53 of tube 32 and anode 34 of said tube is connected to positive terminal 13 of said source, cathode 31 also being connected to lead 17 through the condenser 16.

First considering the operation of the basic full-cycling circuit 56 without the condenser 62, when the potential induced at the end point 88 of the secondary 59 is positive, the rectifier 60 will conduct and output terminal 63 will be at the potential of point 88 or will be positive with respect to output terminal 74. On the succeeding half-cycle of the line voltage 1, when the end point 89 of secondary 59 is positive, the rectifying device 60, assuming a nearly perfect rectifier, will be non-conductive and there will be no current drawn through resistor 61 and consequently no voltage drop so that output terminal 63 is again positive with respect to output terminal 74. As a result, a full-wave rectified voltage would appear (if condenser 62 were omitted) between terminals 63 and 74, with voltage peaks occurring coincident with the voltage peaks of the alternating current line voltage. It is, of course, recognized that such a wave form of voltage would not be obtained if any appreciable current were drawn from the output of the circuit 56, but since this circuit is to be used as a grid bias potential supply in which the current drawn is negligible, it will be understood that such a voltage wave form could be obtained.

If, now, a condenser 62 be added across the resistor 61, a different voltage wave form is obtained. During the half-cycle in which point 88 is positive, rectifier 60 is conductive and condenser 62 is charged during the first half of said half-cycle. During the second half of said half-cycle and during the next succeeding half-cycle, condenser 62 discharges exponentially into resistor 61; the resultant output wave form between terminals 63 and 74 is the algebraic sum of the condenser voltage and the sinusoidal half-cycle of line voltage, producing a warped wave form essentially as shown by the dotted curve 90 of Fig. 3 before the time instant $T_1$; the horizontal line 91 before such time instant is considered as the zero axis or potential of reference point 63 for purposes of this present discussion only, while the curve 90 represents the potential of point 74. As represented by this portion of curve 90, a minimum voltage peak occurs as at 92 and as at time $T_1$, once during each cycle of the alternating current line voltage wave 93 of Fig. 3 and at the beginning of each cycle corresponding to zero line voltage.

For a somewhat more detailed explanation of the operation of such a basic full-cycling circuit, reference is hereby made to the copending application of John W. Dawson and Donald P. Faulk, Ser. No. 733,901, filed March 11, 1947.

A diode rectifier 49 is connected in series with a resistor 50 across condenser 42, with the anodes 51 of said rectifier connected to the end of resistor 50 opposite from point 47 and the cathode 52 of said rectifier connected directly to lead 33 and point 15. Resistor 50 and rectifier 49 are connected across capacitor 42 to prevent the grid 53 of tube 32 from being driven highly positive. When capacitance 42 is charged with point 47 positive with respect to point 15, current flows through resistor 50 and rectifier 49, and only the voltage drop of rectifier 49 appears between point 54 and point 15, said voltage drop being on the order of only a few volts. Under these conditions, point 54 will be positive with respect to point 15 by only the tube 49 voltage drop. Therefore, tube 32 is biased largely by the full-cycling circuit 55 and may, therefore, become conductive at or near line voltage zero once each cycle of line voltage 1. When point 47 is negative with respect to point 15, no current can flow through rectifier tube 49 and resistor 50, so that point 54 will be at the same potential as point 47.

As stated above, during standby, before the energization of relay 22, capacitance 42 is charged with point 47 positive with respect to point 15, so that during standby current flows through resistor 50 and from anode to cathode through rectifier 49. However, the resistance of resistor 50 is quite high, so that this current flow is quite small. Rectifier 49 has such characteristics, due principally to the close electrode spacing thereof, that, even though current is flowing in the conducting direction through said rectifier, at very small current values, such as that occurring during standby, there is actually a negative voltage drop in said rectifier, the so-called "contact potential drop" or "emission current drop." Therefore, during standby, point 54 may be somewhat negative with respect to point 15 or the cathode 31 of tube 32. Since point 54 is in the grid 53 circuit of tube 32, including points 76, 81, and 83 of full-cycling circuit 55, this means that there is applied to grid 53 during standby a potential negative with respect to cathode 31 by the amount of the negative voltage drop of tube 49.

During standby, due to the presence of rectifier 49, condenser 42 is essentially out of the grid circuit of tube 32. Said grid circuit may be traced somewhat as follows: cathode 31 (point 15), rectifier 49, points 54 and 76, point 81, point 83, resistor 84, to grid 53. Although the full-cycling circuit condensers 62 and 75 charge and discharge during operation of the full-cyling circuit, as described above, these condensers have such a capacitance that they do not completely discharge during the time of one full cycle of the line voltage energizing the secondary 71. Therefore, terminal 76 of condenser 75 has a potential which is positive with respect to terminal 102 at the end of each cycle of line voltage, since the condenser is charged with such polarity during the first part of each such cycle. As a result, a negative bias remains on grid 53 at the end of each cycle of line voltage, due to this residual charge on condenser 75, since the grid end 102 of said condenser is negative with respect to the cathode end 76 thereof.

Therefore, both the residual charge on condenser 75 and the negative drop in rectifier 49 provide negative voltages on grid 53 with respect to cathode 31. Tube 32 may be either of a type which fires when the grid voltage is zero with respect to the cathode voltage, or of a type which fires when the grid voltage is slightly positive with respect to the cathode voltage, but is preferably of the latter type. As a result, to provide the required small positive voltage on the grid of tube 32 at the end of each cycle of line voltage during standby, so that said tube will fire at such time if its anode circuit has been completed by the closing of contacts 25, it is necessary to slightly over-compensate the two negative grid voltages referred to at the beginning of this paragraph. This may be done by a voltage which is in opposition to the two negative voltages referred to, or which tends to make the grid 53 positive with respect to cathode 31. Since this overcompensating effect need occur only at the end of each cycle of line voltage, a voltage which has its positive peaks occurring at the time of the voltage zeros of the line voltage in secondary 71, or in other words, a 90° phase-shifted alternating voltage, may be utilized for compensation.

In order to provide such a 90° phase-shifted alternating voltage in the grid circuit of tube 32 for the above purpose, the resistance-capacitance network 77—80 is provided, to add, to the output voltage of the basic full-cycling circuit appearing between points 76 and 81, a 90° phase-shifted voltage which appears between points 81 and 82. The resistors 77 and 78, together with point 83, only serve to apply a portion of the available 90° component to the grid; the phase relations of this component can therefore be considered between points 81 and 82, rather than between points 81 and 83, and the analysis will still be accurate in regard to quality though not to quantity.

First considering point 81 as a reference, the potential of point 76 will vary in a warped manner, as described above, but with this reference, this warped voltage wave will be entirely above or on the positive side of the axis, due to the incomplete discharge of condenser 75. The potential of point 15 or cathode 31 will follow this warped shape also, but will be slightly positive with respect to point 54 (or 76) due to the negative voltage drop of rectifier 49. Due to the phase-shift circuit 79—80, the voltage 81—82 lags the voltage 81—102 by 90° if resistor 79 and condenser 80 have the proper values, so that the potential of point 82 with respect to reference point 81 will be sinusoidal and will have its positive peaks coincident in the time with the zero voltage of point 102 or with the minima of the "warped" voltage of points 15 and 76.

Figure 3:
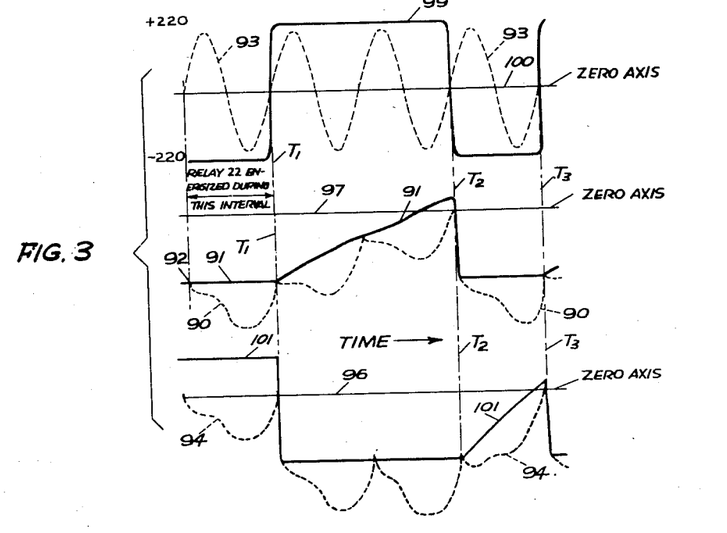
Fig. 3 is a set of curves illustrating the operation of the system.

Now, considering the potential of point 15 or cathode 31 as a reference axis, as indicated by axis 96 in Fig. 3, the voltage variations of point 83, or the grid voltage of tube 32, are represented by wave 94 in Fig. 3. During standby, before or to the left of time T₁, the potential of point 83 with respect to point 15 has a warped pattern which is negative with respect to the zero axis 96 throughout most of the cycle of line voltage 93, but goes slightly above the zero axis 96 at the beginning of each cycle of line voltage due to the addition in the grid circuit of the 90° phase-shifted alternating voltage component appearing between points 81 and 83.

It may be seen that, during standby, there are effectively in the grid circuit of tube 32 the following voltages, and that these voltages are added vectorially: the negative voltage drop of tube 49, the basic full-cycling circuit voltage appearing between points 76 and 81, and the 90° phase-shifted alternating voltage between points 81 and 83.

By properly proportioning the resistances 77 and 78, the voltage wave 94 of point 83 may be made to go positive with respect to axis 96, once during each cycle of line voltage, by an amount equal to the grid-firing voltage of tube 32, so that prior to time T₁, voltage wave 94 "warps" about a line slightly positive with respect to the zero axis 96, as shown in Fig. 3; as a result, the firing of tube 32 is synchronized to zero line voltage at time T₁, since voltage peaks are produced at times coincident with zero line voltage and since such peaks are located on the line about which the "warped" voltage warps. Curve 94, the potential of point 83, represents the voltage on the grid 53 of tube 32 with respect to the zero axis 96 or the cathode 31.

Voltage 94 has voltage peaks occurring once for each cycle of alternating current line voltage 93 and at the beginning of each cycle corresponding to zero line voltage.

It is assumed throughout the present specification, for purposes of simplicity, that tube 32 has such characteristics that it will fire when the potential on the control grid thereof has a slightly positive value with respect to its cathode, and that tube 27 has such characteristics that it will fire when the potential on its control grid reaches zero with respect to its cathode.

The true zero axis 97 of the middle set of curves in Fig. 3 is the potential of reference point 14, so that curve 90 represents, with respect to axis 97, the voltage on grid 65 of tube 27 with respect to the cathode 26 of said tube. Curve 91, since it represents the potential of point 63 or point 41, represents, with respect to zero axis 97, the voltage across condenser 37.

To repeat, the grid circuit of tube 27 may be traced from cathode 26 through the capacitor 37, the full-cycling circuit 56, and the resistor 64, to the control grid 65. Since the full-cycling circuit voltage (between points 63 and 74) returns to zero or reaches a minimum voltage peak once each cycle, tube 27 may be assumed to be biased only by the charge on capacitor 37.

Likewise, the grid circuit of tube 32 may be traced from the cathode 31 through the capacitor 42, resistor 50, the full-cycling circuit 55, and the resistor 84 to the control grid 53. Since tube 49 and resistor 50 act in the manner previously explained, and since the full-cycling circuit voltage (between points 76 and 83) returns approximately to zero or reaches a minimum voltage peak once each cycle, it may be seen that tube 32 is biased largely by the charge on capacitor 42.

It was pointed out that, in the standby condition, the full-cycling circuit 55 causes the voltage on grid 53 to go slightly positive with respect to cathode 31 at or near each line voltage zero. Therefore, tube 32 will become conductive at or near line voltage zero if its anode circuit is closed.

When relay 22 is energized, contacts 24 are opened and contacts 25 are closed, contacts 24 opening the short-circuit across tube 27 and contacts 25 connecting the power source 9 into the anode-cathode circuit of tube 32. At or near the next following line voltage zero after relay 22 is energized, tube 32 conducts.

It will be recalled that, during standby, condenser 16 was charged with point 14 positive and point 15 negative. When tube 32 conducts, the charge on condenser 16 is reversed through a circuit from source 9 as follows: terminal 13, anode 34, cathode 31, lead 33, point 15, condenser 16, point 14, lead 17, inductor 30, resistor 29, closed contacts 25, and terminal 12. A resonant circuit composed of condenser 16, inductor 30, and resistor 29 is thus energized. The impedance values of inductor 30 and resistor 29 are selected to cause the charging of condenser 16 to occur in approximately 0.001 sec. with minimum power loss; these values are so chosen that the circuit is preferably almost critically damped and so that the voltage to which condenser 16 charges will be approximately equal to the voltage of the supply 9.

In Fig. 3, relay 22 is energized sometime during the interval denoted by the corresponding legend, while tube 32 conducts at time $T_1$, which coincides with the next succeeding voltage zero of line voltage wave 93, this coincidence being produced by the full-cycling circuit 55 which produces a voltage represented by curve 94 on the grid 53 of tube 32, said voltage returning to a line slightly above zero axis 96 once each cycle of line voltage 93 during standby, as above described. Curve or wave 99 in Fig. 3 represents the voltage variations of point 15, while the upper zero axis 100 represents the potential of reference point 14. During standby, before or to the left of time $T_1$, condenser 16 is charged with terminal 15 thereof negative with respect to terminal 14 by an amount equal to the voltage of source 9, as explained above.

At time instant $T_1$, tube 32 conducts, causing a reversal of the charge on condenser 16 to occur in approximately 0.001 sec., terminal 15 thereof then going positive with respect to terminal 14 by an amount equal to the voltage of source 9 (which is equal to that of source 8), so that voltage wave 99 goes positive almost instantaneously at time $T_1$, to mark the beginning of the "on" time and to begin the positive loop of the square-wave voltage output pulse.

During standby, as explained above, condenser 37 is charged with terminal 41 thereof negative with respect to terminal 14, so that solid curve 91, which represents the voltage variations of point 41 with respect to the zero axis 97 or point 14, or which represents the voltage across condenser 37, is horizontal and below the zero axis 97, on the left of time instant $T_1$. Dotted curve 90 represents the voltage variations on grid 65, which voltage is the sum of the warped voltage wave produced by full-cycling circuit 56 and the voltage of condenser 37; therefore, curve 90 (the potential of point 74) has the shape and position illustrated to the left of $T_1$.

Zero axis 96 is the reference potential of point 15. Curve 101 represents the voltage across condenser 42, or the voltage variations of point 47. During standby, as explained above, condenser 42 is charged with point 47 positive with respect to point 15 by an amount equal to the voltage of source 8, so that wave 101 is horizontal and above the zero axis on the left of instant $T_1$. Wave 94 represents the voltage variations of point 83, or the voltage variations on grid 53; during standby this wave is the algebraic sum of the warped voltage wave of full-cycling circuit 55 and the potential of point 54, so that during standby (to the left of instant $T_1$) curve 94 is "warping" with respect to a line slightly above the axis 96. In this connection it should be noted that tube 49 only operates during standby to synchronize the first cycle of "on" time (represented by the time during which wave 99 is above the zero axis 100) to the line voltage zero. If tube 49 were not used and if only a basic full-cycling circuit were used, the voltage on grid 53 would be "warping" with respect to the line 101, which is so highly positive that tube 32 would not wait until the zero point of voltage wave 93 to fire, but would be fired instantly at whatever point in the line voltage cycle the relay 22 was energized.

At time $T_1$, when tube 32 conducts, the charge on condenser 42 is reversed through a circuit from source 9 as follows: terminal 13, anode 34, cathode 31, lead 33, point 15, condenser 42, point 47, rectifier 43, lead 17, inductor 30, resistor 29, closed contacts 25, and terminal 12. Point 47 is now substantially negative with respect to point 15, so no further current flows in rectifier 49 and point 54 is at the potential of point 47. Therefore, a substantial negative bias is applied to grid 53, biasing tube 32 beyond cutoff and preventing further conduction in said tube if it is extinguished by an effective drop in anode voltage. Since condenser 16 charges reversely in approximately 0.001 sec., and since condenser 42 is of much smaller capacity than is condenser 16 and is effectively connected in parallel therewith by rectifier tube 43, when point 15 is positive with respect to point 14 condenser 42 will immediately assume the same charge as condenser 16 because of almost instantaneous conduction through tube 43, so that a negative bias is placed on the grid 53 of tube 32 a very short time after time $T_1$, when said tube conducts.

The negative voltage of condenser 42 immediately after time instant $T_1$ is shown by the drop in curve 101, at time $T_1$, to a value substantially negative with respect to the zero axis 96. Since there is no longer any drop in resistor 50, and since point 54 is at the potential of point 47, the total voltage on grid 53 is the algebraic sum of the voltage of condenser 42 and the voltage of full-cycling circuit 55, so that voltage wave 94, which is the voltage on grid 53, "warps" with respect to a line which is parallel to but slightly positive with respect to the substantially horizontal line 101 because of the phase-shifted alternating current component in circuit 55, as explained above, after the instant $T_1$. Such voltage rises slightly above line 101 at the end of each cycle of line voltage 93 because of the presence of the phase-shifted alternating component, added by network 77—80, in the full-cycling voltage of circuit 55.

The cathode 31 of thyratron 32 is connected to the negative terminal 12 of source 9, to the positive terminal 13 of which anode 34 is connected, only through capacitors 16 and/or 42, resistor 29, and inductor 30. Thus, said thyratron is connected in a so-called series type of control circuit, in which a condenser and an inductance are connected in series between the source 9 and the anode-cathode circuit. Current can flow in such a circuit only while the condenser 16 charges; since the tube 32 passes current in only one direction, anode current ceases as soon as the condenser 16 is fully charged and said tube cannot be fired again until the charged condenser 16 has been discharged or charged in the opposite direction. Since thyratron 32 is biased beyond cut-off very shortly after said thyratron conducts, and since inductor 30 and resistor 29 are so chosen that condenser 16 charges from source 9 in approximately 0.001 sec., tube 32 is extinguished almost immediately at time instant $T_1$ and cannot be fired again until condenser 16 has been discharged or charged in the opposite direction.

Capacitor 37, formerly charged so that point 14 was positive with respect to point 41, cannot have its charge reversed instantly because current cannot flow in the reverse direction through tube 38. However, with condenser 16 charged with point 14 negative and point 15 positive, the two charges, on condenser 16 and on condenser 37, are connected in series aiding so that double voltage is applied to the adjustable "on" time timing resistor 48. Condenser 37 discharges into condenser 16 through the timing resistor 48. As condenser 37 is very small in comparison with condenser 16, it tends to discharge and and then recharge therefrom in the opposite direction, that is, with point 41 positive with respect to point 14.

In Fig. 3, wave 91 represents the voltage across condenser 37, or the potential of point 41 with respect to the reference line 97 or potential of point 14. After or to the right of instant $T_1$, as condenser 37 discharges through resistor 48, the wave 91 rises toward the zero axis 97 as the potential of point 41 rises from its former negative value toward the zero axis 97 and tends to go positive. Wave 90, which represents the total voltage on grid 65, is the algebraic sum of the voltage across condenser 37 and the voltage of full-cycling circuit 56, so that said wave "warps" with respect to the curve 91' after the instant $T_1$.

Since condenser 37 discharges into condenser 16 through timing resistor 48, adjustment or variation of the resistance of said resistor varies the rate of discharge of said condenser. Although condenser 37 tends to recharge in the opposite direction, it cannot do so. When the potential of point 41 arrives at or near zero potential with respect to point 14, tube 27 will become conductive at the next succeeding line voltage zero, since the voltage of the full-cycling circuit 56 returns to a minimum at line voltage zero, and since said tube is not now short-circuited. It will be remembered that the voltage on grid 65 of thyratron 27 is the algebraic sum of the voltage on condenser 37 and the voltage of full-cycling circuit 56.

It will be recalled that, shortly after time instant $T_1$, condenser 16 was charged with point 15 positive and point 14 negative. When thyratron 27 conducts at time $T_2$, the charge on condenser 16 is again reversed, said condenser being again discharged and recharged to the original condition through a circuit from source 9 as follows: terminal 11, anode 28, cathode, 26, lead 17, point 14, condenser 16, point 15, lead 33, inductor 35, resistor 36, and terminal 10. A resonant circuit composed of condenser 16, inductor 35, and resistor 36 is thus energized. The values of inductor 35 and resistor 36 are selected to cause the charging of condenser 16 to occur in approximately 0.001 sec. with minimum power loss; these values are so chosen that the circuit is preferably almost critically damped and so that the voltage to which condenser 16 charges will be approximately equal to the voltage of the supply 9. It should be pointed out that, without the inductors 30 and 35, the charging of condenser 16 would follow an exponential curve, with excessively high initial peak currents. The inductors limit the peak charging current to a reasonable value.

In Fig. 3, thyratron 27 conducts at time instant $T_2$, which coincides with a voltage zero of line voltage wave 93, this coincidence being produced by full-cycling circuit 56, as described above. From a time instant shortly after instant $T_1$ to instant $T_2$, condenser 16 is charged with point 15 positive with respect to point 14, as represented by wave 99. At time instant $T_2$, thyratron 27 conducts, causing a reversal of the charge on condenser 16 to occur in approximately 0.001 sec., terminal 15 thereof then going negative with respect to terminal 14 by an amount equal to the voltage of source 9, so that voltage wave 99 goes negative almost instantaneously at time $T_2$, to mark the end of the "on" time and to end the positive loop of the square-wave voltage output.

Since the time of firing of tube 27 to reverse the charge on condenser 16 to thereby end the "on" time or the positive loop of output wave 99 depends upon the discharge time of condenser 37 and since said discharge time depends in turn upon the resistance of resistor 48, by varying said resistance the length of the positive loop or "on" time of output wave 99 may be varied. Since the full-cycling circuit 56 insures that the tube 27 will be fired to end the "on" time only at a voltage zero of line voltage 93, and since the full-cycling circuit 55 insures the tube 32 will be fired to begin the "on" time only at a voltage zero of line voltage 93, the "on" time or positive loop of output wave 99 will consist of an integral number of cycles of line voltage 93. In Fig. 3, the number of cycles of "on" time (between $T_1$ and $T_2$) is illustrated as two. Resistor 48 may therefore be calibrated in cycles.

Figure 2:
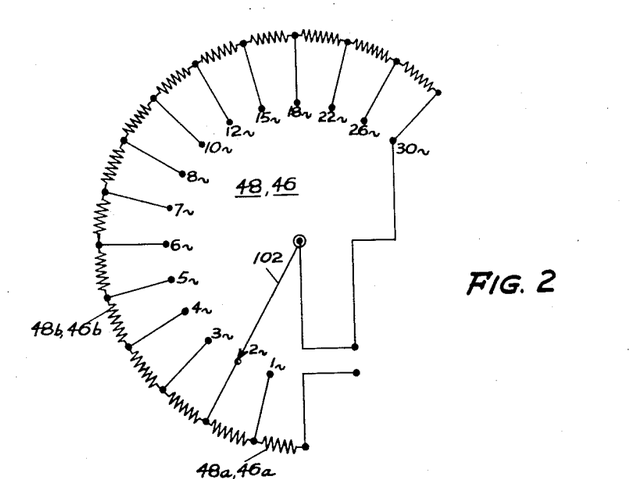
Fig. 2 is a detailed circuit arrangement for the adjustable calibration resistors for predetermining the durations of the positive or negative loops of the square voltage output wave.

Fig. 2 of the drawings is a detailed view of one form of adjustable resistor 48 having tapped sections 48a, b, etc. The selector switch arm 102 is shown in the drawing to be set to a resistance tap corresponding to a calibrated amount of resistance sufficient to cause condenser 37 to discharge at a predetermined rate for permitting thyratron 27 to conduct after a predetermined period of time equal to the time duration of two cycles of alternating current line voltage 93, as illustrated in Fig. 3. Thus the positive loop of the voltage wave 99 appearing between the timing system output leads 17 and 18 will have a duration equal to two cycles of line voltage 93, as shown in Fig. 3. As stated, both the beginning $T_1$ and the end $T_2$ of the positive loop of wave 99 are substantially coincident with the same predetermined point in the cycle of line voltage 93, namely zero line voltage.

When tube 27 conducts at instant $T_2$, condenser 37 is charged, with point 41 again negative with respect to point 14, from source 8 through a circuit as follows: terminal 11, anode 28, cathode 26, lead 17, point 14, condenser 37, point 41, rectifier 38, lead 33, inductor 35, resistor 36, and terminal 10. With point 41 negative with respect to point 14, a substantial negative bias is applied to grid 65, biasing tube 27 beyond cutoff and preventing further conduction in said tube if it is extinguished by an effective drop in anode voltage. Since the charge on condenser 16 is reversed in approximately 0.001 sec. by the conduction of tube 27, and since condenser 37 is of much smaller capacitance than is condenser 16 and is effectively connected in parallel therewith by rectifier tube 38, when point 14 is positive with respect to point 15 condenser 37 will immediately assume the same charge as condenser 16 because of almost instantaneous conduction through tube 38, so that a negative bias is placed on the grid 65 of tube 27 a very short time after instant $T_2$ when said tube conducts.

The negative voltage of condenser 37 immediately after time instant $T_2$ is shown by the drop in curve 91, at time $T_2$, to a value substantially negative with respect to the zero axis 97. The total voltage on grid 65 is the algebraic sum of the voltage across condenser 37 and the voltage of full-cyling circuit 56, so that voltage wave 90, which is the voltage on grid 65, "warps" with respect to the substantially horizontal line 91 after the instant $T_2$.

When tube 27 conducts at the end of the "on" period or at instant $T_2$, main capacitor 16 has its charge reversed, as described above, and this reversal of charge is effectuated from source 8 through inductor 35. As a result, a single pulse of current flows through said inductor each and every time, during energization of the system, that condenser 16 is charged from source 8, or at the end of each and every "on" time. A coil 87 may be inductively coupled, if desired, to inductor 35, in order to transfer the single pulsation produced at the end of each "on" time to a suitable pulsation counting circuit, such as that disclosed and claimed in my copending application, Ser. No. 784,221, filed Nov. 5, 1947.

The cathode 26 of thyratron 27 is connected to the negative terminal 10 of source 8, to the positive terminal 11 of which anode 28 is connected, only through capacitors 37 and/or 16, inductor 35, and resistor 36. Thus, said thyratron is connected in a so-called series type of control circuit, in which a condenser and an inductor are connected in series between the source 8 and the anode-cathode circuit. Current can flow in such a circuit only while the condenser 16 charges; since the tube 27 passes current in only one direction, anode current ceases as soon as the condenser 16 is fully charged and said tube cannot be fired again until the charged condenser 16 has been discharged or charged in the opposite direction. Since thyratron 27 is biased beyond cutoff very shortly after said thyratron conducts, and since inductor 35 and resistor 36 are so chosen that condenser 16 charges from source 8 in approximately 0.001 sec., tube 27 is extinguished almost immediately at time instant $T_2$ and cannot be fired again until condenser 16 has been discharged or charged in the opposite direction.

Condenser 42, formerly charged so that point 47 was negative with respect to point 15, cannot have its charge reversed instantly, when tube 27 is conductive, because current cannot flow in the reverse direction through tube 43. Consequently, condenser 42 discharges through the "off" time timing resistor 46 into condenser 16, in the same manner as did condenser 37 during the preceding "on" time. Condensers 42 and 16 are connected in series aiding across said resistor. As condenser 42 is very small in comparison with condenser 16, it tends to discharge and then recharge therefrom in the opposite direction, that is, with point 47 positive with respect to point 15. Since condenser 42 discharges into condenser 16 through timing resistor 46, adjustment or variation of the resistance of said resistor varies the rate of discharge of said condenser.

In Fig. 3, after or to the right of instant $T_2$, as condenser 42 discharges through resistor 46, wave 101, which represents the voltage across condenser 42, rises toward the zero axis 96 as the potential of point 47 rises from its former negative value with respect to point 15 and tends to go positive. Wave 94, which represents the total voltage on grid 53, is the algebraic sum of the voltage across condenser 42 and the voltage of full-cycling circuit 55, so that said wave "warps" with respect to a curve parallel to but slightly positive with respect to the curve 101 after the instant $T_2$.

Although condenser 42 tends to recharge in the opposite direction (with point 47 positive with respect to point 15), it cannot do so. When the potential of point 47 arrives at a slightly positive potential with respect to point 15, tube 32 will become conductive at the next succeeding line voltage zero, since the voltage of the full-cycling circuit 55 returns to a minimum peak at line voltage zero, and since said tube is not open-circuited as long as relay 22 is energized and contacts 25 are closed. It will be remembered that the voltage on grid 53 of thyratron 32 is the algebraic sum of the voltage on condenser 42 and the voltage of full-cycling circuit 55.

In Fig. 3, thyratron 32 conducts at time instant $T_3$, which coincides with a voltage zero of line voltage wave 93, this coincidence being effectuated by full-cycling circuit 55, as described above. From a time instant shortly after instant $T_2$ to instant $T_3$, condenser 16 is charged with point 15 negative with respect to point 14, as represented by wave 99. At time instant $T_3$, thyratron 32 conducts, causing a reversal of the charge on condenser 16 to occur in approximately 0.001 sec., terminal 15 thereof then going positive with respect to terminal 14 by an amount equal to the voltage of source 9, so that voltage wave 99 goes positive almost instantaneously at time $T_3$, to mark the end of the "off" time, to end the negative loop of the square wave voltage output 99, and to begin a succeeding positive loop of the voltage output wave.

Since the time of firing of tube 32 to reverse the charge on condenser 16 to thereby end the "off" time or the negative loop of output wave 99 depends upon the discharge time of condenser 42 and since said discharge time depends in turn upon the resistance of the resistor 46, by varying said resistance the length of the negative loop or "off" time of output wave 99 may be varied. Since the full-cycling circuit 55 insures that the tube 32 will be fired to end the "off" time only at a voltage zero of line voltage 93, and since the full-cycling circuit 56 insures that the tube 27 will be fired to begin the "off" time only at a voltage zero of line voltage 93, the "off" time or negative loop of output wave 99 will consist of an integral number of cycles of line voltage 93. In Fig. 3, the number of cycles of "off" time (between $T_2$ and $T_3$) is illustrated as one. Resistor 46 may therefore be calibrated in cycles.

Fig. 2 also serves as a detailed view of adjustable resistor 46 which may preferably be similar to resistor 48. For the condition illustrated, of course, the selector switch arm of resistor 46 would be set to a resistance tap corresponding to a calibrated amount of resistance sufficient to cause condenser 42 to discharge at a predetermined rate for permitting thyratron 32 to conduct after a predetermined period of time equal to the time duration of one cycle of alternating current line voltage 93. Thus the negative loop of the voltage wave 99 appearing between the timing system output leads 17 and 18 will have a duration equal to one cycle of line voltage 93, as shown in Fig. 3. As stated, both the beginning $T_2$ and end $T_3$ of the negative loop of wave 99 are substantially coincident with the same predetermined point in the cycle of line voltage 93, namely zero line voltage.

When tube 32 again conducts at time $T_3$, the above cycle repeats itself indefinitely as long as relay 22 remains energized, stopping when said relay is deenergized. Approximately at the time $T_3$, the charge on condenser 16 is reversed, point 15 again going positive with respect to point 14, as shown by curve 99, to begin another positive loop or "on" time of the system output wave. The condenser 37 again begins to discharge through "on" time timing resistor 48 into condenser 16, the potential of point 41 increasing from its high negative value toward zero, as represented by curve 91. The condenser 42 is almost instantaneously charged from the source 9 at time $T_3$, the potential of point 47 almost instantaneously going to a high negative value, as represented by curve 101.

Since condensers 37 and 42 are both very small compared to condenser 16, the change of voltage on the latter, when the former charge from the latter or when the former discharge into the latter, is negligible.

Because both the charge and discharge voltages of the condensers 37 and 42 are dependent on the charge of condenser 16, the timing system will stand large variations in supply voltage without changing the timing. This constancy is also achieved partially by the use of the full-cycling circuits, which cause the "on" and "off" periods to each be equal to a predetermined integral number of cycles of the line voltage, thus making the timing responsive to line frequency in effect and not to line voltage.

The duration of either the positive or negative loops of the square output wave may be independently adjusted merely by changing the value of the corresponding resistors 48 or 46.

From an examination of Fig. 3, it may be seen (see curve 90) that, at all times, including standby, the voltage on grid 65 goes to zero with respect to cathode 26 only during the exponential discharge of condenser 37. Since this is so, and since the values of the steps of resistor 48 may be made such as to cause the condenser 37 to discharge to zero well before the end of the corresponding cycle of line voltage, the voltage in the grid circuit due to the incomplete discharge of the full-cycling circuit condenser 62, which voltage is negative with respect to cathode 26, has no appreciable effect in the full-cycling action of circuit 56. Therefore, no 90° phase-shifted alternating component network need be provided in the full-cycling circuit 56.

Of course, it is to be understood that this invention is not limited to the particular details as described above, as many equivalents will suggest themselves to those skilled in the art. It is accordingly desired that the appended claims be given a broad interpretation commensurate with the scope of this invention within the art.

What is claimed is:

1. A timing system including, in combination, a first capacitance, means for charging said capacitance with a predetermined polarity, a second capacitance and a unilateral conducting device connected in series across said first capacitance, said device being so poled that it will conduct only in such a direction as to charge said second capacitance with said predetermined polarity, means for charging said first capacitance with a polarity opposite to said predetermined polarity through a circuit having a short time constant to thereby reverse the polarity of the voltage across said first capacitance and begin the time interval, impedance means connected across said device to provide a series discharge circuit consisting of said impedance means and said first and second capacitances, whereby the reversed voltage across said first capacitance and the voltage across said second capacitance are connected in series aiding in said discharge circuit and whereby said capacitances will discharge through said discharge circuit during said time interval, and means for utilizing the discharge of said capacitances to measure the time interval.

2. A timing system including, in combination, a first capacitance, controllable means for charging said capacitance with a predetermined polarity through a circuit having a short time constant, a second capacitance and a unilateral conducting device connected in series across said first capacitance, said device being so poled that it will conduct only in such a direction as to charge said second capacitance with said predetermined polarity, means for charging said first capacitance with a polarity opposite to said predetermined polarity through a circuit having a short time constant to thereby reverse the polarity of the voltage across said first capacitance and begin the time interval, impedance means connected across said device to provide a series discharge circuit consisting of said impedance means and said first and second capacitances, whereby the reversed voltage across said first capacitance and the voltage across said second capacitance are connected in series aiding in said discharge circuit and whereby said capacitances will discharge through said discharge circuit during said time interval, and means responsive to a predetermined difference between the voltages across said first and second capacitances for controlling said controllable means to again charge said first capacitance with said predetermined polarity to end the time interval.

3. A timing system including, in combination, a first capacitance, a first source of voltage, a controllable gaseous discharge device having its anode-cathode path connected in series between said source and said capacitance, said device being rendered conducting to complete a circuit for charging said capacitance from said source with a predetermined polarity, a second capacitance and a rectifier connected in series across said first capacitance, said rectifier being so poled that it will conduct only in such a direction as to charge said second capacitance with said predetermined polarity, means for charging said first capacitance with a polarity opposite to said predetermined polarity through a circuit having a short time constant to thereby reverse the polarity of the voltage across said first capacitance and begin the time interval, impedance means connected across said rectifier to provide a series discharge circuit consisting of said impedance means and said first and second capacitances, whereby the reversed voltage across said first capacitance and the voltage across said second capacitance are connected in series aiding in said discharge circuit and whereby said capacitances will discharge through said discharge circuit during said time interval, and means for utilizing the discharge of said capacitances to measure the time interval.

4. A timing system including, in combination, a first condenser, a first source of voltage, a grid-controlled gaseous discharge device having its anode-cathode path connected in series between said source and said condenser, said device being rendered conducting to complete a circuit having a short time constant for charging said condenser from said source with a predetermined polarity, a second condenser and a rectifier connected in series across said first condenser, said rectifier being so poled that it will conduct only in such a direction as to charge said second condenser with said predetermined polarity, said second condenser having a small capacitance compared to that of said first condenser, means connecting the voltage across said second condenser to the grid of said device to provide a bias thereon which is negative when said second condenser is charged with said predetermined polarity, means for charging said first condenser with a polarity opposite to said predetermined polarity through a circuit having a short time constant to thereby reverse the polarity of the voltage across said first condenser and begin the time interval, and impedance means connected across said rectifier to provide a series discharge circuit consisting of said impedance means and said first and second condensers, whereby the reversed voltage across said first condenser and the voltage across said second condenser are connected in series aiding in said discharge circuit and whereby said second condenser will discharge through said discharge circuit during said time interval, a triggering voltage being applied to said grid to render said device conductive to again charge said first condenser with said predetermined polarity and thereby end the time interval when said second condenser discharges to a predetermined voltage.

5. A timing system including, in combination, a first condenser, a first source of voltage, a controllable gaseous discharge device having its anode-cathode path connected in series between said source and said condenser, said device being rendered conducting to complete a circuit for charging said condenser from said source with a predetermined polarity, a second condenser and a rectifier connected in series across said first condenser, said rectifier being so poled that it will conduct only in such a direction as to charge said second condenser with said predetermined polarity, a second source of voltage, a controllable gaseous discharge device having its anode-cathode path connected in series between said second source and said first condenser, means for rendering said last-named device conducting to complete a circuit for charging said first condenser from said second source with a polarity opposite to said predetermined polarity through a circuit having a short time constant to thereby reverse the polarity of the voltage across said first condenser and begin the time interval, impedance means connected across said rectifier to provide a series discharge circuit consisting of said impedance means and said first and second condensers, whereby the reversed voltage across said first condenser and the voltage across said second condenser are connected in series aiding in said discharge circuit and whereby said condensers will discharge through said discharge circuit during said time interval, and means for utilizing the discharge of said condensers to measure the time interval.

6. A system for producing a voltage pulse having a duration of a predetermined number of full cycles of alternating current, comprising a source of alternating current, a first source of direct current, a first capacitance, the voltage pulse appearing as a change of voltage polarity between the opposite terminals of said capacitance, controllable means for connecting said capacitance to said direct current source to charge the same with a predetermined polarity through a circuit having a short time constant, a second capacitance and a unilateral conducting device connected in series across said first capacitance, said device being so poled that it will conduct only in such a direction as to charge said second capacitance with said predetermined polarity, a second source of direct current, means for connecting said first capacitance to said second source coincident in time with a predetermined point in the cycle of said alternating current to charge said capacitance therefrom with a polarity opposite to said predetermined polarity through a circuit having a short time constant, thereby reversing the polarity of the voltage between the terminals of said first capacitance and beginning the voltage pulse, impedance means connected across said device to provide a series discharge circuit consisting of said impedance means and said first and second capacitances, whereby the reversed voltage between the terminals of said first capacitance and the voltage across said second capacitance are connected in series aiding in said discharge circuit and whereby said capacitances will discharge through said discharge circuit after the beginning of said voltage pulse, and means responsive to a predetermined difference between the voltages across said first and second capacitances for controlling said controllable means to reconnect said first capacitance to said first direct current source to recharge the said capacitance with said predetermined polarity at a predetermined time following the connection of said first capacitance to said second source and coincident in time with a recurrence of said predetermined point in the cycle of said alternating current.

7. A system for producing a voltage pulse having a duration of a predetermined number of full cycles of alternating current, comprising a source of alternating current, a first source of direct current, a first condenser, the voltage pulse appearing as a change of voltage polarity between the opposite terminals of said condenser, a grid-controlled gaseous discharge device having its anode-cathode path connected in series between said direct current source and said condenser, said device being rendered conducting to complete a circuit having a short time constant for charging said condenser from said source with a predetermined polarity, a second condenser and a rectifier connected in series across said first condenser, said rectifier being so poled that it will conduct only in such a direction as to charge said second condenser with said predetermined polarity, said second condenser having a small capacitance compared to that of said first condenser, means connecting the voltage across said second condenser to the grid of said device to provide a bias thereon which is negative when said second condenser is charged with said predetermined polarity, a second source of direct current, means for connecting said first condenser to said second source coincident in time with a predetermined point in the cycle of said alternating current to charge said condenser therefrom with a polarity opposite to said predetermined polarity through a circuit having a short time constant, thereby reversing the polarity of the voltage between the terminals of said first condenser and beginning the voltage pulse, and impedance means connected across said rectifier to provide a series discharge circuit consisting of said impedance means and said first and second condensers, whereby the reversed voltage across said first condenser and the voltage across said second condenser are connected in series aiding in said discharge circuit and whereby said second condenser will discharge through said discharge circuit after the beginning of said voltage pulse, said first means including a grid bias circuit connected to said alternating current source for providing a grid bias voltage having a voltage peak coincident in time with the recurrence of said predetermined point in the cycle of said alternating current, whereby a triggering voltage will be applied to said grid to render said device conductive to reconnect said first condenser to said first direct current source to recharge the same with said predetermined polarity when said second condenser discharges to a predetermined voltage, at a predetermined time following the connection of said first condenser to said second source and coincident in time with a recurrence of said predetermined point in the cycle of said alternating current.

8. A timing system including, in combination, a first capacitance, means for charging said capacitance with a predetermined polarity, a second capacitance and a unilateral conducting device connected in series across said first capacitance, said device being so poled that it will conduct only in such a direction as to charge said second capacitance with said predetermined polarity, means for charging said first capacitance with a polarity opposite to said predetermined polarity through a circuit having a short time constant to thereby reverse the polarity of the voltage across said first capacitance and begin the time interval, impedance means connected across said device to provide a series discharge circuit consisting of said impedance means and said first and second capacitances, whereby the reversed voltage across said first capacitance and the voltage across said second capacitance are connected in series aiding in said discharge circuit and whereby said capacitances will discharge through said discharge circuit during said time interval, and means for utilizing the discharge of said capacitances to measure the time interval, said impedance means being adjustable to vary the rate of discharge of said capacitances and therefore also the length of the time interval.

9. A system for producing a substantially square voltage output wave having successive positive and negative loops, comprising a first capacitance, the output wave appearing as a change of voltage polarity across said capacitance, said capacitance originally being charged with a predetermined polarity, controllable means for charging said capacitance with a polarity opposite to said predetermined polarity through a circuit having a short time constant to reverse the polarity of the original voltage across said first capacitance and begin a positive loop of said wave, a second capacitance and a first unilateral conducting device connected in series across said first capacitance, said device being so poled that it will conduct only in such a direction as to charge said second capacitance with said predetermined polarity, said second capacitance originally being charged with said predetermined polarity, impedance means connected across said device to provide a series discharge circuit consisting of said impedance means and said first and second capacitances, whereby the reversed voltage across said first capacitance and the original voltage across said second capacitance are connected in series aiding in said discharge circuit and whereby said capacitances will discharge through said discharge circuit during said positive loop, means responsive to a predetermined difference between the voltages across said first and second capacitances for charging said first capacitance with said predetermined polarity through a circuit having a short time constant to thereby end the positive loop and begin the negative loop of said wave, a third capacitance and a second unilateral conducting device connected in series across said first capacitance, said second device being so poled that it will conduct only in such a direction as to charge said third capacitance with a polarity opposite to said predetermined polarity through said first-named means, impedance means connected across said second device to provide a series discharge circuit consisting of said last-named impedance means and said first and third capacitances, whereby the voltage of said predetermined polarity across said first capacitance resulting from the operation of said responsive means and the voltage opposite to said predetermined polarity across said third capacitance resulting from the operation of said first-named means are connected in series aiding in said discharge circuit and whereby said capacitances will discharge through said discharge circuit during said negative loop, and means responsive to a predetermined difference between the voltages across said first and third capacitances for controlling said controllable means to recharge said first capacitance through said first-named circuit with a polarity opposite to said predetermined polarity to end the negative loop and begin a succeeding positive loop of said wave.

10. A system for producing a substantially square voltage output wave having successive positive and negative loops, comprising a first capacitance, the output wave appearing as a change of voltage polarity across said capacitance, said capacitance originally being charged with a predetermined polarity, controllable means for charging said capacitance with a polarity opposite to said predetermined polarity through a circuit having a short time constant to reverse the polarity of the original voltage across said first capacitance and begin a positive loop of said wave, a second capacitance and a first unilateral conducting device connected in series across said first capacitance, said device being so poled that it will conduct only in such a direction as to charge said second capacitance with said predetermined polarity, said second capacitance originally being charged with said predetermined polarity, impedance means connected across said device to provide a series discharge circuit consisting of said impedance means and said first and second capacitances, whereby the reversed voltage across said first capacitance and the original voltage across said second capacitance are connected in series aiding in said discharge circuit and whereby said capacitances will discharge through said discharge circuit during said positive loop, means responsive to a predetermined difference between the voltages across said first and second capacitances for charging said first capacitance with said predetermined polarity through a circuit having a short time constant to thereby end the positive loop and begin the negative loop of said wave, a third capacitance and a second unilateral conducting device connected in series across said first capacitance, said second device being so poled that it will conduct only in such a direction as to charge said third capacitance with a polarity opposite to said predetermined polarity through said first-named means, impedance means connected across said second device to provide a series discharge circuit consisting of said last-named impedance means and said first and third capacitances, whereby the voltage of said predetermined polarity across said first capacitance resulting from the operation of said responsive means and the voltage opposite to said predetermined polarity across said third capacitance resulting from the operation of said first-named means are connected in series aiding in said discharge circuit and whereby said capacitances will discharge through said discharge circuit during said negative loop, and means responsive to a predetermined difference between the voltages across said first and third capacitances for controlling said controllable means to recharge said first capacitance through said first-named circuit with a polarity opposite to said predetermined polarity to end the negative loop and begin a succeeding positive loop of said wave, both of said impedance means being independently adjustable to vary independently the rate of discharge of the corresponding capacitances and therefore also the length of the corresponding loop of the square output wave.

11. A system for producing a substantially square voltage output wave having successive positive and negative loops, comprising a first condenser, the voltage wave appearing as a change of voltage polarity across said condenser, said condenser originally being charged with a predetermined polarity, a first source of voltage, a controllable gaseous discharge device having its anode-cathode path connected in series between said source and said condenser, said device being rendered conducting to complete a circuit for charging said condenser from said source with a polarity opposite to said predetermined polarity through a circuit having a short time constant to reverse the polarity of the original voltage across said first condenser and begin a positive loop of said wave, a second condenser and a first rectifier connected in series across said first condenser, said rectifier being so poled that it will conduct only in such a direction as to charge said second condenser with said predetermined polarity, said second condenser originally being charged with said predetermined polarity, impedance means connected across said rectifier to provide a series discharge circuit consisting of said impedance means and said first and second condensers, whereby the reversed voltage across said first condenser and the original voltage across said second condenser are connected in series aiding in said discharge circuit and whereby said condensers will discharge through said discharge circuit during said positive loop, a second source of voltage, a controllable gaseous discharge device having its anode-cathode path connected in series between said second source and said first condenser, means responsive to a predetermined difference between the voltages across said first and second condensers for rendering said last-named device conducting to complete a circuit for charging said first condenser from said second source with said predetermined polarity through a circuit having a short time constant to thereby end the positive loop and begin the negative loop of said wave, a third condenser and a second rectifier connected in series across said first condenser, said second rectifier being so poled that it will conduct only in such a direction as to charge said third condenser with a polarity opposite to said predetermined polarity through said first-named device, impedance means connected across said second rectifier to provide a series discharge circuit consisting of said last-named impedance means and said first and third condensers, whereby the voltage of said predetermined polarity across said first condenser resulting from the conduction of said last-named device and the voltage opposite to said predetermined polarity across said third condenser resulting from the conduction of said first-named device are connected in series aiding in said discharge circuit and whereby said condensers will discharge through said discharge circuit during said negative loop, and means responsive to a predetermined difference between the voltages across said first and third condensers for rendering said first-named device conducting to complete a circuit for recharging said first condenser from said first source with a polarity opposite to said predetermined polarity through said first-named circuit to end the negative loop and begin a succeeding positive loop of said wave.

12. A timing system including, in combination, a first condenser, means for charging said condenser with a predetermined polarity, a second condenser and a unilateral conducting device connected in series across said first condenser, said device being so poled that it will conduct only in such a direction as to charge said second condenser with said predetermined polarity, said second condenser having a small capacitance compared to that of said first condenser, means for charging said first condenser with a polarity opposite to said predetermined polarity through a circuit having a short time constant to thereby reverse the polarity of the voltage across said first condenser and begin the time interval, impedance means connected across said device to provide a series discharge circuit consisting of said impedance means and said first and second condensers, whereby the reversed voltage across said first condenser and the voltage across said second condenser are connected in series aiding in said discharge circuit and whereby said second condenser will discharge through said discharge circuit during said time interval, and means for utilizing the discharge of said second condenser to measure the time interval.

13. A system for producing a substantially square voltage output wave having successive positive and negative loops, comprising a first condenser, the output wave appearing as a change of voltage polarity across said condenser, said condenser originally being charged with a predetermined polarity, controllable means for charging said condenser with a polarity opposite to said predetermined polarity through a circuit having a short time constant to reverse the polarity of the original voltage across said first condenser and begin a positive loop of said wave, a second condenser and a first unilateral conducting device connected in series across said first condenser, said device being so poled that it will conduct only in such a direction as to charge said second condenser with said predetermined polarity, said second condenser having a small capacitance compared to that of said first condenser, said second condenser originally being charged with said predetermined polarity, impedance means connected across said device to provide a series discharge circuit consisting of said impedance means and said first and second condensers, whereby the reversed voltage across said first condenser and the original voltage across said second condenser are connected in series aiding in said discharge circuit and whereby said second condenser will discharge through said discharge circuit during said positive loop, means responsive to a predetermined voltage across said second condenser for charging said first condenser with said predetermined polarity through a circuit having a short time constant to thereby end the positive loop and begin the negative loop of said wave, a third condenser and a second unilateral conducting device connected in series across said first condenser, said second device being so poled that it will conduct only in such a direction as to charge said third condenser with a polarity opposite to said predetermined polarity through said first-named means, said third condenser having a small capacitance compared to that of said first condenser, impedance means connected across said second device to provide a series discharge circuit consisting of said last-named impedance means and said first and third condensers, whereby the voltage of said predetermined polarity across said first condenser resulting from the operation of said responsive means and the voltage opposite to said predetermined polarity across said third condenser resulting from the operation of said first-named means are connected in series aiding in said discharge circuit and whereby said third condenser will discharge through said discharge circuit during said negative loop, and means responsive to a predetermined voltage across said third condenser for controlling said controllable means to recharge said first condenser through said first-named circuit with a polarity opposite to said predetermined polarity to end the negative loop and begin a succeeding positive loop of said wave.

14. A system for producing a substantially square voltage output wave having successive positive and negative loops, comprising a first condenser, the voltage wave appearing as a change of voltage polarity across said condenser, said condenser originally being charged with a predetermined polarity, a first source of voltage, a grid-controlled gaseous discharge device having its anode-cathode path connected in series between said source and said condenser, said device being rendered conducting to complete a circuit for charging said condenser from said source with a polarity opposite to said predetermined polarity through a circuit having a short time constant to reverse the polarity of the original voltage across said condenser and begin a positive loop of said wave, a second condenser and a first rectifier connected in series across said first condenser, said rectifier being so poled that it will conduct only in such a direction as to charge said second condenser with said predetermined polarity, said second condenser having a small capacitance compared to that of said first condenser, said second condenser originally being charged with said predetermined polarity, impedance means connected across said rectifier to provide a series discharge circuit consisting of said impedance means and said first and second condensers, whereby the reversed voltage across said first condenser and the original voltage across said second condenser are connected in series aiding in said discharge circuit and whereby said second condenser will discharge through said discharge circuit during said positive loop, a second source of voltage, a grid-controlled gaseous discharge device having its anode-cathode path connected in series between said second source and said first condenser, means connecting the voltage across said second condenser to the grid of said last-named device to provide a bias thereon which is negative when said second condenser is charged with said predetermined polarity, a triggering voltage being applied to said last-named grid to render said last-named device conductive, when said second condenser discharges to a predetermined voltage, to complete a circuit for charging said first condenser from said second source with said predetermined polarity through a circuit having a short time constant to thereby end the positive loop and begin the negative loop of said wave, a third condenser and a second rectifier connected in series across said first condenser, said second rectifier being so poled that it will conduct only in such a direction as to charge said third condenser with a polarity opposite to said predetermined polarity through said first-named device, said third condenser having a small capacitance compared to that of said first condenser, means connecting the voltage across said third condenser to the grid of said first-named device to provide a bias thereon which is negative when said third condenser is charged with a polarity opposite to said predetermined polarity, and impedance means connected across said second rectifier to provide a series discharge circuit consisting of said last-named impedance means and said first and third condensers, whereby the voltage of said predetermined polarity across said first condenser resulting from the conduction of said last-named device and the voltage opposite to said predetermined polarity across said third condenser resulting from the conduction of said first-named device are connected in series aiding in said discharge circuit and whereby said third condenser will discharge through said discharge circuit during said negative loop, a triggering voltage being applied to said first-named grid to render said first-named device conductive, when said third condenser discharges to a predetermined voltage, to complete a circuit for recharging said first condenser from said first source with a polarity opposite to said predetermined polarity through said first-named circuit to end the negative loop and begin a succeeding positive loop of said wave.

15. A system for producing a substantially square voltage output wave having successive positive and negative loops, comprising a first condenser, the voltage wave appearing as a change of voltage polarity across said condenser, said condenser originally being charged with a predetermined polarity, a first source of voltage, a grid-controlled gaseous discharge device having its anode-cathode path connected in series between said source and said condenser, said device being rendered conducting to complete a circuit for charging said condenser from said source with a polarity opposite to said predetermined polarity through a circuit having a short time constant to reverse the polarity of the original voltage across said condenser and begin a positive loop of said wave, a second condenser and a first rectifier connected in series across said first condenser, said rectifier being so poled that it will conduct only in such a direction as to charge said second condenser with said predetermined polarity, said second condenser having having a small capacitance compared to that of said first condenser, said second condenser originally being charged with said predetermined polarity, impedance means connected across said rectifier to provide a series discharge circuit consisting of said impedance means and said first and second condensers, whereby the reversed voltage across said first condenser and the original voltage across said second condenser are connected in series aiding in said discharge circuit and whereby said second condenser will discharge through said discharge circuit during said positive loop, a second source of voltage, a grid-controlled gaseous discharge device having its anode-cathode path connected in series between said second source and said first condenser, means connecting the voltage across said second condenser to the grid of said last-named device to provide a bias thereon which is negative when said second condenser is charged with said predetermined polarity, a triggering voltage being applied to said last-named grid to render said last-named device conductive, when said second condenser discharges to a predetermined voltage, to complete a circuit for charging said first condenser from said second source with said predetermined polarity through a circuit having a short time constant to thereby end the positive loop and begin the negative loop of said wave, a third condenser and a second rectifier connected in series across said first condenser, said second rectifier being so poled that it will conduct only in such a direction as to charge said third condenser with a polarity opposite to said predetermined polarity through said first-named device, said third condenser having a small capacitance compared to that of said first condenser, means connecting the voltage across said third condenser to the grid of said first-named device to provide a bias thereon which is negative when said third condenser is charged with a polarity opposite to said predetermined polarity, and impedance means connected across said second rectifier to provide a series discharge circuit consisting of said last-named impedance means and said first and third condensers, whereby the voltage of said predetermined polarity across said first condenser resulting from the conduction of said last-named device and the voltage opposite to said predetermined polarity across said third condenser resulting from the conduction of said first-named device are connected in series aiding in said discharge circuit and whereby said third condenser will discharge through said discharge circuit during said negative loop, a triggering voltage being applied to said first-named grid to render said first-named device conductive, when said third condenser discharges to a predetermined voltage, to complete a circuit for recharging said first condenser from said first source with a polarity opposite to said predetermined polarity through said first-named circuit to end the negative loop and begin a succeeding positive loop of said wave, both of said impedance means being independently adjustable to vary independently the rate of discharge of the corresponding capacitance and therefore also the length of the corresponding loop of the square output wave.

16. A system for producing a substantially square voltage output wave having successive positive and negative loops, comprising a first condenser, the voltage wave appearing as a change of voltage polarity across said condenser, said condenser originally being charged with a predetermined polarity, a first source of voltage, a grid-controlled gaseous discharge device having its anode-cathode path connected in series between said source and said condenser, said device being rendered conducting to complete a circuit for charging said condenser from said source with a polarity opposite to said predetermined polarity through a circuit having a short time constant to reverse the polarity of the original voltage across said condenser and begin a positive loop of said wave, a second condenser and a first rectifier connected in series across said first condenser, said rectifier being so poled that it will conduct only in such a direction as to charge said second condenser with said predetermined polarity, said second condenser having a small capacitance compared to that of said first condenser, said second condenser originally being charged with said predetermined polarity, impedance means connected across said rectifier to provide a series discharge circuit consisting of said impedance means and said first and second condensers, whereby the reversed voltage across said first condenser and the original voltage across said second condenser are connected in series aiding in said discharge circuit and whereby said second condenser will discharge through said discharge circuit during said positive loop, a second source of voltage, a grid-controlled gaseous discharge device having its anode-cathode path connected in series between said second source and said first condenser, means connecting the voltage across said second condenser to the grid of said last-named device to provide a bias thereon which is negative when said second condenser is charged with said predetermined polarity, a triggering voltage being applied to said last-named grid to render said last-named device conductive, when said second condenser discharges to a predetermined voltage, to complete a circuit for charging said first condenser from said second source with said predetermined polarity through a circuit having a short time constant to thereby end the positive loop and begin the negative loop of said wave, a third condenser and a second rectifier connected in series across said first condenser, said second rectifier being so poled that it will conduct only in such a direction as to charge said third condenser with a polarity opposite to said predetermined polarity through said first-named device, said third condenser having a small capacitance compared to that of said first condenser, means connecting the voltage across said third condenser to the grid of said first-named device to provide a bias thereon which tends to be positive when said third condenser is charged with said predetermined polarity and which is negative when said third condenser is charged with a polarity opposite to said predetermined polarity, impedance means connected across said second rectifier to provide a series discharge circuit consisting of said last-named impedance means and said first and third condensers and to provide a circuit for charging said third condenser with said predetermined polarity from said second source, whereby the voltage of said predetermined polarity across said first condenser resulting from the conduction of said last-named device and the voltage opposite to said predetermined polarity across said third condenser resulting from the conduction of said first-named device are connected in series aiding in said discharge circuit and whereby said third condenser will discharge through said discharge circuit during said negative loop, a triggering voltage being applied to said first-named grid to render said first-named device conductive, when said third condenser discharges to a predetermined voltage, to complete a circuit for recharging said first condenser from said first source with a polarity opposite to said predetermined polarity through said first-named circuit to end the negative loop and begin a succeeding positive loop of said wave, and a resistor and rectifier connected in series across said third condenser, said resistor being connected between said third condenser and the grid of said first-named device and said last-named rectifier being so poled that it will conduct only in such a direction as to limit the charge on said third condenser when it tends to charge with said predetermined polarity.

17. A system for producing a substantially square voltage output wave having successive positive and negative loops each having a duration of a predetermined number of full cycles of alternating current, comprising a source of alternating current, a first source of direct current, a first condenser, the output wave appearing as a change of voltage polarity across said condenser, said condenser originally being charged with a predetermined polarity, controllable means for connecting said condenser to said direct current source coincident in time with a predetermined point in the cycle of said alternating current to charge said condenser therefrom with a polarity opposite to said predetermined polarity through a circuit having a short time constant to reverse the polarity of the original voltage across said first condenser and begin a positive loop of said wave, a second condenser and a first rectifier connected in series across said first condenser, said rectifier being so poled that it will conduct only in such a direction as to charge said second condenser with said predetermined polarity, said second condenser originally being charged with said predetermined polarity, impedance means connected across said rectifier to provide a series discharge circuit consisting of said impedance means and said first and second condensers, whereby the reversed voltage across said first condenser and the original voltage across said second condenser are connected in series aiding in said discharge circuit and whereby said condensers will discharge through said discharge circuit during said positive loop, a second source of direct current, means responsive to a predetermined difference between the voltages across said first and second condensers for connecting said first condenser to said second source, at a predetermined time following the connection of said first condenser to said first source and coincident in time with a recurrence of said predetermined point in the cycle of said alternating current, through a circuit having a short time constant to charge the same therefrom with said predetermined polarity to thereby end the positive loop and begin the negative loop of said wave, a third condenser and a second rectifier connected in series across said first condenser, said second rectifier being so poled that it will conduct only in such a direction as to charge said third condenser with a polarity opposite to said predetermined polarity through said controllable means, impedance means connected across said second rectifier to provide a series discharge circuit consisting of said last-named impedance means and said first and third condensers, whereby the voltage of said predetermined polarity across said first condenser resulting from the operation of said responsive means and the voltage opposite to said predetermined polarity across said third condenser resulting from the operation of said controllable means are connected in series aiding in said discharge circuit and whereby said condensers will discharge through said discharge circuit during said negative loop, and means responsive to a predetermined difference between the voltages across said first and third condensers for controlling said controllable means to reconnect said first condenser to said first source to recharge the same therefrom through said first-named circuit with a polarity opposite to said predetermined polarity to end the negative loop and begin a succeeding positive loop of said wave, at a predetermined time following the connection of said first condenser to said second source and coincident in time with a recurrence of said predetermined point in the cycle of said alternating current.

18. A system for producing a substantially square voltage output wave having successive positive and negative loops each having a duration of a predetermined number of full cycles of alternating current, comprising a source of alternating current, a first source of direct current, a first condenser, the output wave appearing as a change of voltage polarity across said condenser, said condenser originally being charged with a predetermined polarity, controllable means for connecting said condenser to said direct current source coincident in time with a predetermined point in the cycle of said alternating current to charge said condenser therefrom with a polarity opposite to said predetermined polarity through a circuit having a short time constant to reverse the polarity of the original voltage across said first condenser and begin a positive loop of said wave, a second condenser and a first rectifier connected in series across said first condenser, said rectifier being so poled that it will conduct only in such a direction as to charge said second condenser with said predetermined polarity, said second condenser originally being charged with said predetermined polarity, impedance means connected across said rectifier to provide a series discharge circuit consisting of said impedance means and said first and second condensers, whereby the reversed voltage across said first condenser and the original voltage across said second condenser are connected in series aiding in said discharge circuit and whereby said condensers will discharge through said discharge circuit during said positive loop, a second source of direct current, means responsive to a predetermined difference between the voltages across said first and second condensers for connecting said first condenser to said second source, at a predetermined time following the connection of said first condenser to said first source and coincident in time with a recurrence of said predetermined point in the cycle of said alternating current, through a circuit having a short time constant to charge the same therefrom with said predetermined polarity to thereby end the positive loop and begin the negative loop of said wave, a third condenser and a second rectifier connected in series across said first condenser, said second rectifier being so poled that it will conduct only in such a direction as to charge said third condenser with a polarity opposite to said predetermined polarity through said controllable means, impedance means connected across said second rectifier to provide a series discharge circuit consisting of said last-named impedance means and said first and third condensers, whereby the voltage of said predetermined polarity across said first condenser resulting from the operation of said responsive means and the voltage opposite to said predetermined polarity across said third condenser resulting from the operation of said controllable means are connected in series aiding in said discharge circuit and whereby said condensers will discharge through said discharge circuit during said negative loop, and means responsive to a predetermined difference between the voltages across said first and third condensers for controlling said controllable means to reconnect said first condenser to said first source to recharge the same therefrom through said first-named circuit with a polarity opposite to said predetermined polarity to end the negative loop and begin a succeeding positive loop of said wave, at a predetermined time following the connection of said first condenser to said second source and coincident in time with a recurrence of said predetermined point in the cycle of said alternating current, both of said impedance means being independently adjustable to vary independently the rate of discharge of the corresponding capacitances and therefore also the duration in number of cycles of alternating current of the corresponding loop of the square output wave.

19. A system for producing a substantially square voltage output wave having successive positive and negative loops each having a duration of a predetermined number of full cycles of alternating current, comprising a source of alternating current, a first source of direct current, a first condenser, the output wave appearing as a change of voltage polarity across said condenser, said condenser originally being charged with a predetermined polarity, a grid-controlled gaseous discharge device having its anode-cathode path connected in series between said direct current source and said condenser, said device being rendered conducting coincident in time with a predetermined point in the cycle of said alternating current to complete a circuit for charging said condenser from said direct current source with a polarity opposite to said predetermined polarity through a circuit having a short time constant to reverse the polarity of the original voltage across said condenser and begin a positive loop of said wave, a second condenser and a first rectifier connected in series across said first condenser, said rectifier being so poled that it will conduct in such a direction as to charge said second condenser with said predetermined polarity, said second condenser having a small capacitance compared to that of said first condenser, said second condenser originally being charged with said predetermined polarity, impedance means connected across said rectifier to provide a series discharge circuit consisting of said impedance means and said first and second condensers, whereby the reversed voltage across said first condenser and the original voltage across said second condenser are connected in series aiding in said discharge circuit and whereby said second condenser will discharge through said discharge circuit during said positive loop, a second source of direct current, a grid-controlled gaseous discharge device having its anode-cathode path connected in series between said second source and said first condenser, means connecting the voltage across said second condenser to the grid of said last-named device to provide a bias thereon which is negative when said second condenser is charged with said predetermined polarity, said last-named means including a grid bias circuit connected to said alternating current source for providing a grid bias voltage having a voltage peak coincident in time with the recurrence of said predetermined point in the cycle of said alternating current, whereby a triggering voltage is applied to said last-named grid to render said last-named device conductive, when said second condenser discharges to a predetermined voltage, at a predetermined time following the connection of said first condenser to said first source and coincident in time with a recurrence of said predetermined point in the cycle of said alternating current, to complete a circuit for charging said first condenser from said second source with said predetermined polarity through a circuit having a short time constant to thereby end the positive loop and begin the negative loop of said wave, a third condenser and a second rectifier connected in series across said first condenser, said second rectifier being so poled that it will conduct only in such a direction as to charge said third condenser with a polarity opposite to said predetermined polarity through said first-named device, said third condenser having a small capacitance compared to that of said first condenser, impedance means connected across said second rectifier to provide a series discharge circuit consisting of said last-named impedance means and said first and third condensers, whereby the voltage of said predetermined polarity across said first condenser resulting from the conduction of said last-named device and the voltage opposite to said predetermined polarity across said third condenser resulting from the conduction of said first-named device are connected in series aiding in said discharge circuit and whereby said third condenser will discharge through said discharge circuit during said negative loop, means connecting the voltage across said third condenser to the grid of said first-named device to provide a bias thereon which is negative when said third condenser is charged with a polarity opposite to said predetermined polarity, said last-named means including a grid bias circuit connected to said alternating current source for providing a grid bias voltage having a voltage peak coincident in time with the recurrence of said predetermined point in the cycle of said alternating current, whereby a triggering voltage is applied to said first-named grid to render said first-named device conductive, when said third condenser discharges to a predetermined votlage, at a predetermined time following the connection of said first condenser to said second source and coincident in time with a recurrence of said predetermined point in the cycle of said alternating current, to complete a circuit for recharging said first condenser from said first source with a polarity opposite to said predetermined polarity through said first-named circuit to end the negative loop and begin a succeeding positive loop of said wave.

DONALD P. FAULK.

REFERENCES CITED

The following references are of record in the file of this patent:

FOREIGN PATENTS

| Number | Country | Date |
| --- | --- | --- |
| 113,839 | Australia | Sept. 10, 1941 |